United States Patent
Ikeda (10) Patent No.: US 8,107,534 B2
(45) Date of Patent: Jan. 31, 2012

(54) MOVING-IMAGE REPRODUCING APPARATUS AND MOVING-IMAGE REPRODUCING METHOD

(75) Inventor: Hitoshi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 12/559,269

(22) Filed: Sep. 14, 2009

(65) Prior Publication Data

US 2010/0067880 A1 Mar. 18, 2010

(30) Foreign Application Priority Data

Sep. 16, 2008 (JP) ................................. 2008-236315

(51) Int. Cl.
*H04N 7/12* (2006.01)
(52) U.S. Cl. ............................... 375/240.12; 375/240.25
(58) Field of Classification Search ...... 375/240–240.29
See application file for complete search history.

(56) References Cited

U.S. PATENT DOCUMENTS

| | | | |
|---|---|---|---|
| 5,835,151 A * | 11/1998 | Sun et al. ...................... | 348/441 |
| 5,959,690 A | 9/1999 | Toebes, VIII et al. | |
| 6,031,572 A * | 2/2000 | Christopoulos ............ | 375/240.1 |
| 6,621,933 B2 * | 9/2003 | Chung et al. ................. | 382/233 |
| 7,110,025 B1 | 9/2006 | Loui et al. | |
| 2001/0010705 A1* | 8/2001 | Min ......................... | 375/240.11 |
| 2002/0009139 A1* | 1/2002 | Honda et al. .............. | 375/240.03 |
| 2003/0235248 A1* | 12/2003 | Kim et al. ................. | 375/240.12 |
| 2004/0120403 A1 | 6/2004 | Sugahara | |
| 2005/0152457 A1 | 7/2005 | Regunathan | |
| 2008/0273094 A1 | 11/2008 | Kunieda | |
| 2009/0046781 A1* | 2/2009 | Moriya et al. ........... | 375/240.12 |

FOREIGN PATENT DOCUMENTS

| | | |
|---|---|---|
| JP | 2000-115777 A | 4/2000 |
| JP | 2003-070002 A | 3/2003 |
| JP | 2007-067526 A | 3/2007 |
| JP | 2008-301475 A | 12/2008 |

OTHER PUBLICATIONS

XP010346543, Kami H et al, "A network MPEG camera", Consumer Electronics, 1999, IEEE, Jun. 22, 1999, pp. 82-83.
XP02637074, Kyungtae Han et al, "Using Checksum to Reduce Power Consumption of display Systems for Low-Motion Content", IEEE, Oct. 4, 2009.

* cited by examiner

*Primary Examiner* — Hong Cho
(74) *Attorney, Agent, or Firm* — Canon USA, Inc., I.P. Division (57) ABSTRACT

A moving-image reproducing apparatus determines whether one frame of a movie has the same image as that of the previous frame on the basis of the analysis of the movie, inputs compressed frame data about a frame that is not determined to have the same image as that of the previous frame into a decompressing unit, causes the image in the frame data decompressed by the decompressing unit to be displayed as at least one frame, and causes the compressed frame data about a frame that is determined to have the same image as that of the previous frame not to be input into the decompressing unit.

9 Claims, 6 Drawing Sheets

MOVING-IMAGE REPRODUCING APPARATUS AND MOVING-IMAGE REPRODUCING METHOD

BACKGROUND OF THE INVENTION

1. Field of the Invention

The present invention relates to a moving-image reproducing apparatus, a moving-image reproducing method, a program, and a recording medium for decompressing a digital compressed moving image to reproduce the decompressed moving image.

2. Description of the Related Art

Along with development of technologies for efficiently encoding and compressing digital videos in recent years, not only personal computers (PCs) but also digital cameras and mobile phones are capable of decompressing and decoding digital videos that are encoded and compressed to reproduce the digital videos.

In typical encoding and compression methods for digital videos, for example, in H.264 and Moving Picture Experts Group (MPEG), each image (hereinafter referred to as a frame) composing a video is divided into small rectangular blocks (hereinafter referred to as macroblocks (MBs)). Space correlation or time correlation is used for each MB to generate predicted data. Then, after a transformation coefficient (difference coefficient) resulting from orthogonal transformation of the difference between the image data about the MB and the predicted data is subjected to quantization and scan conversion, variable length coding is performed and space redundancy is reduced to achieve a higher coding efficiency.

However, it is necessary to make a large amount of calculation and perform memory transfer in order to reproduce such a digital video that is subjected to encoding and compression. Accordingly, restrictions on resolution, frame rate, bit rate, etc. often apply to reproducible video data from the viewpoint of the processing capacity and the power consumption.

In such a situation, moving-image reproducing apparatuses capable of decreasing the amount of memory transfer and reducing the power consumption are proposed. For example, Japanese Patent Laid-Open No. 2000-115777 and Japanese Patent Laid-Open No. 2007-67526 disclose technologies in which a prediction frame memory and/or a display frame memory is not updated if an input bit stream is decoded and an MB to be decompressed satisfies a certain condition on the basis of encoding information that is output in order to reduce the amount of memory transfer.

Figure 6:
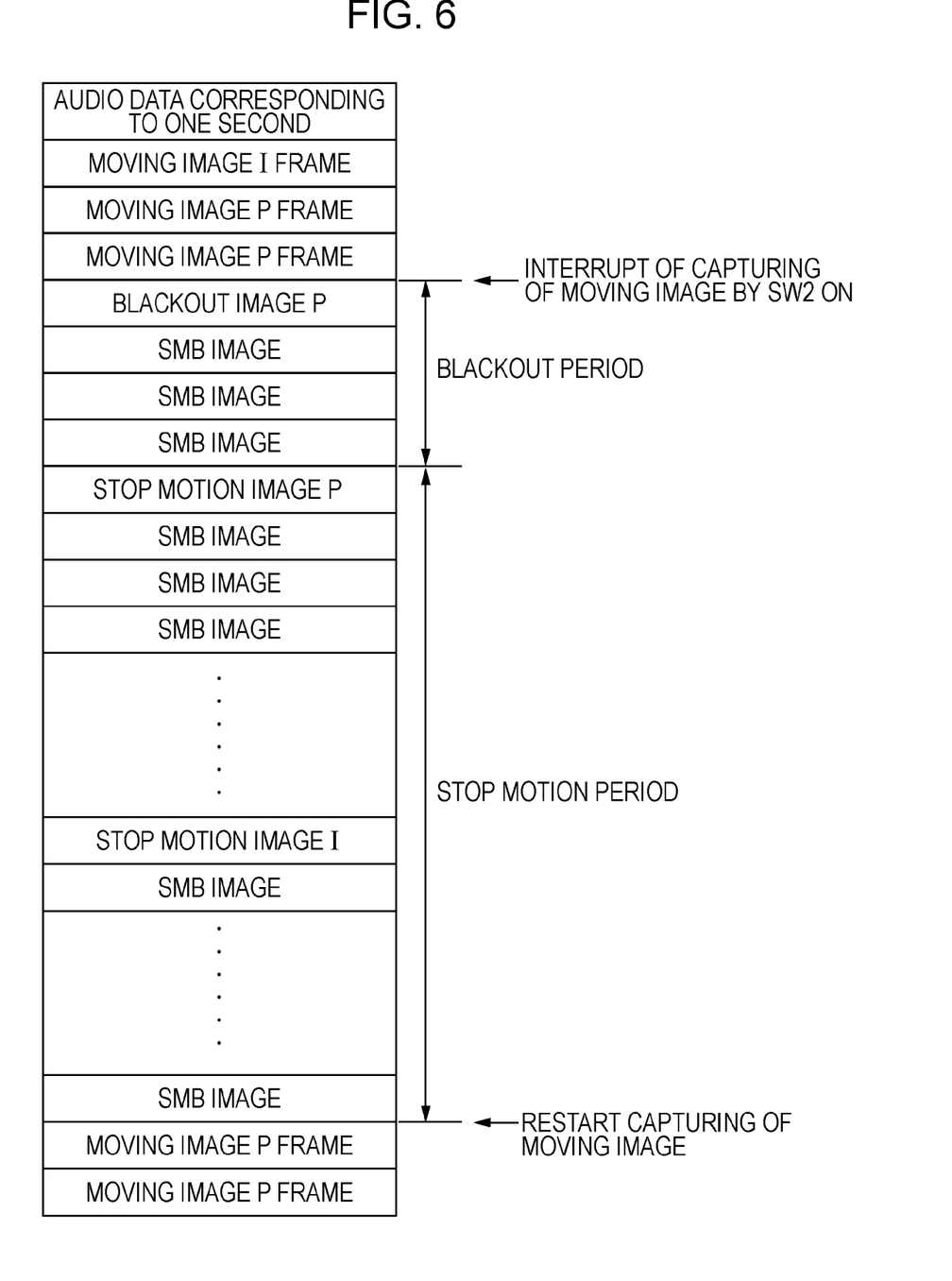
FIG. 6 illustrates an example of the structure of moving image data in related art.

In addition, it is possible to capture still images during recording of moving images in recent years. In recording of still images during capturing of moving images, a moving image file can be created into which blackout images and/or alternate frames for the still images are inserted so that the moving image file is not divided into two segments with the capturing of the still image sandwiched therebetween while the recording of the moving image is interrupted by the capturing of the still image. An image pickup apparatus capable of decreasing the data size of moving image data to reduce the load of writing on a recording medium is disclosed (Japanese Patent Application No. 2008-053415 (Japanese Patent Laid-Open No. 2008-301475)). The image pickup apparatus disclosed in Japanese Patent Application No. 2008-053415 generates moving image data shown in FIG. 6. Referring to FIG. 6, the blackout images for multiple frames and the still-image alternate images (stop motion images) for multiple frames, which are inserted while recording of moving images is interrupted by capturing of still images, are represented as skipped macroblock images (hereinafter referred to as SMB images). In each SMB image, all the MBs are SMBs. The SMB image is one kind of an interframe compressed image and indicates information about the difference between the frames. For example, the SMB image has no motion vector. The SMB image is image data having a very small data size on the order of several tens of bytes even in Video Graphics Array (VGA). The SMB image represents that completely the same image as that displayed in the previous frame is displayed.

However, it is necessary to refer to the previous frame for every MB in order to reproduce the SMB image in reproduction of the moving image data shown in FIG. 6. Accordingly, the amount of memory transfer is greatly increased to cause an increase in processing load and power consumption. Consequently, it is desirable to reduce the amount of memory transfer and the power consumption.

SUMMARY OF THE INVENTION

The present invention provides a moving-image reproducing apparatus capable of reducing the amount of memory transfer and the power consumption.

According to an exemplary embodiment of the present invention, a moving-image reproducing apparatus includes an attribute analyzing unit configured to analyze an attribute of a movie; a determining unit configured to determine whether one frame of the movie has the same image as that of the previous frame on the basis of the analysis by the attribute analyzing unit; an input unit configured to input compressed frame data about a frame that is not determined to have the same image as that of the previous frame into a decompressing unit; a display controlling unit configured to cause the image in the frame data decompressed by the decompressing unit to be displayed as at least one frame; and a controlling unit configured to cause the compressed frame data about a frame that is determined to have the same image as that of the previous frame not to be input into the decompressing unit.

According to another exemplary embodiment of the present invention, a moving-image reproducing method includes analyzing an attribute of a movie; determining whether one frame of the movie has the same image as that of the previous frame on the basis of the analysis in the attribute analyzing step; inputting compressed frame data about a frame that is not determined to have the same image as that of the previous frame into a decompressing unit; causing the image in the frame data decompressed by the decompressing unit to be displayed as at least one frame; and causing the compressed frame data about a frame that is determined to have the same image as that of the previous frame not to be input into the decompressing unit.

According to another exemplary embodiment of the present invention, a computer-readable recording medium stores a program causing a computer to execute computer-executable instructions. The program includes computer-executable instructions for analyzing an attribute of a movie; computer-executable instructions for determining whether one frame of the movie has the same image as that of the previous frame on the basis of the analysis; computer-executable instructions for inputting compressed frame data about a frame that is not determined to have the same image as that of the previous frame into a decompressing unit; computer-executable instructions for causing the image in the frame data decompressed by the decompressing unit to be displayed as at least one frame; and computer-executable instructions for causing the compressed frame data about a frame that is determined to have the same image as that of the previous frame not to be input into the decompressing unit.

According to the present invention, it is possible to reduce the amount of memory transfer and the power consumption in reproduction of an SMB image.

This summary of the invention does not necessarily describe all necessary features so that the invention may also be a sub-combination of these described features. Further features of the present invention will become apparent from the following description of the exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DESCRIPTION OF THE EMBODIMENTS

Exemplary embodiments of the present invention will be described in detail below with reference to the accompanying drawings.

It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

Figure 1A:
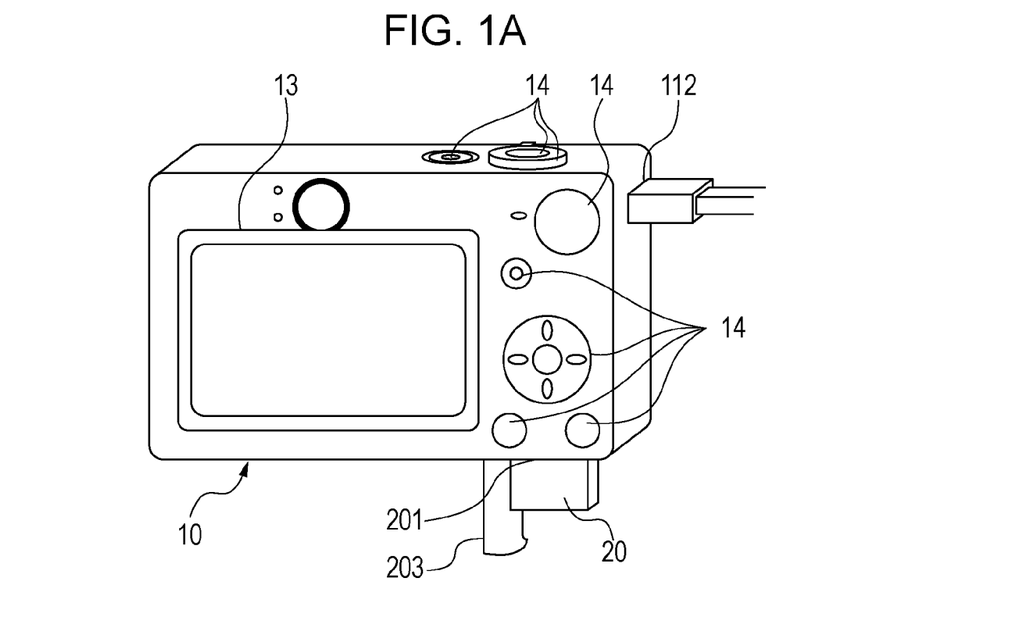
FIG. 1A is an external view of a moving-image reproducing apparatus according to an exemplary embodiment of the present invention and FIG. 1B is a block diagram showing an example of the configuration of the moving-image reproducing apparatus according to the exemplary embodiment of the present invention.

FIG. 1A is an external view of a moving-image reproducing apparatus 10 according to an exemplary embodiment of the present invention. Referring to FIG. 1A, a display unit 13 displays an image and/or a variety of information. A connector 112 is used to connect the moving-image reproducing apparatus 10 with a connection cable. An operation unit 14 includes operation members, such as various switches and buttons and a touch panel, which receive various operations from a user. A recording medium 20 is, for example, a memory card or a hard disk. The recording medium 20 is loaded in a recording medium slot 201. The recording medium 20 loaded in the recording medium slot 201 is capable of communicating with the moving-image reproducing apparatus 10. The recording medium slot 201 has a cover 203.

Figure 1B:
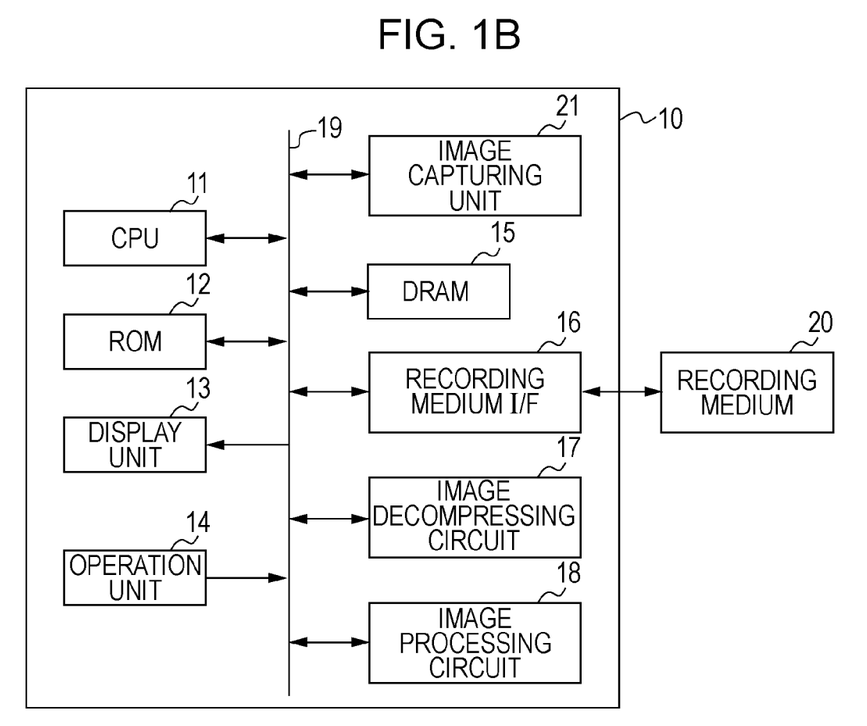

FIG. 1B is a block diagram showing an example of the configuration of the moving-image reproducing apparatus 10 according to the exemplary embodiment of the present invention. Referring to FIG. 1B, the moving-image reproducing apparatus 10 includes a central processing unit (CPU) 11, a read only memory (ROM) 12, the display unit 13, the operation unit 14, a dynamic random access memory (DRAM) 15, a recording medium interface 16, an image decompressing circuit 17, an image processing circuit 18, and an image capturing unit 21 that are connected to each other via an internal bus 19.

The CPU 11 functions as a control unit controlling each processing unit and data flows described below. The ROM 12 stores programs (firmware) concerning procedures of the CPU 11 and a variety of information.

The display unit 13 is, for example, a color liquid crystal display. The display unit 13 is used to display an image that is reproduced and a graphic user interface. A video displayed in the display unit 13 may be supplied to an external display apparatus, such as a television set, via the connector 112 (not shown in FIG. 1B) or over wireless communication to be displayed in the external display apparatus.

The operation unit 14 includes the operations members, such as various buttons, a cross cursor, a control wheel, and a dial switch, which receive an instruction from the user.

The DRAM 15 is used as a working area for the CPU 11. The DRAM 15 has a function of extracting various programs and a buffer function of temporarily storing image data, display data, data resulting from decoding of an image, and so on. The data is normally written in and read out from the DRAM 15 via a memory controller (not shown). A direct memory access (DMA) controller is provided between each processing unit and the DRAM 15, although not shown in FIG. 1B. With DMA controller, the CPU initiates the transfer and performs other operations whilst the transfer is in progress, rather than being fully occupied by the transfer during the read/write operation.

The recording medium interface 16 is an interface through which image data is written in and read out from a recording medium, such as a compact flash (CF) card or a secure digital (SD) card. The recording medium 20 is a removable recording medium, such as the CF card or the SD card. The recording medium 20 may be any recording medium supporting random access. For example, the recording medium 20 may be an optical disk (digital versatile disk (DVD)) or a hard disk.

The image decompressing circuit 17 decompresses image data that is compressed in, for example, H.264 format into YUV data. The image decompressing circuit 17 will be described below with reference to FIG. 2.

The image processing circuit 18 resizes the YUV data decompressed in the image decompressing circuit 17 into an arbitrary size, rotates the YUV data, and/or performs color conversion on the YUV data.

The image capturing unit 21 includes a lens, an aperture, a shutter, and an image pickup device, such as a charge coupled device (CCD) sensor or a complementary metal oxide semiconductor (CMOS) sensor. The image capturing unit 21 captures an image of an object.

Figure 2:
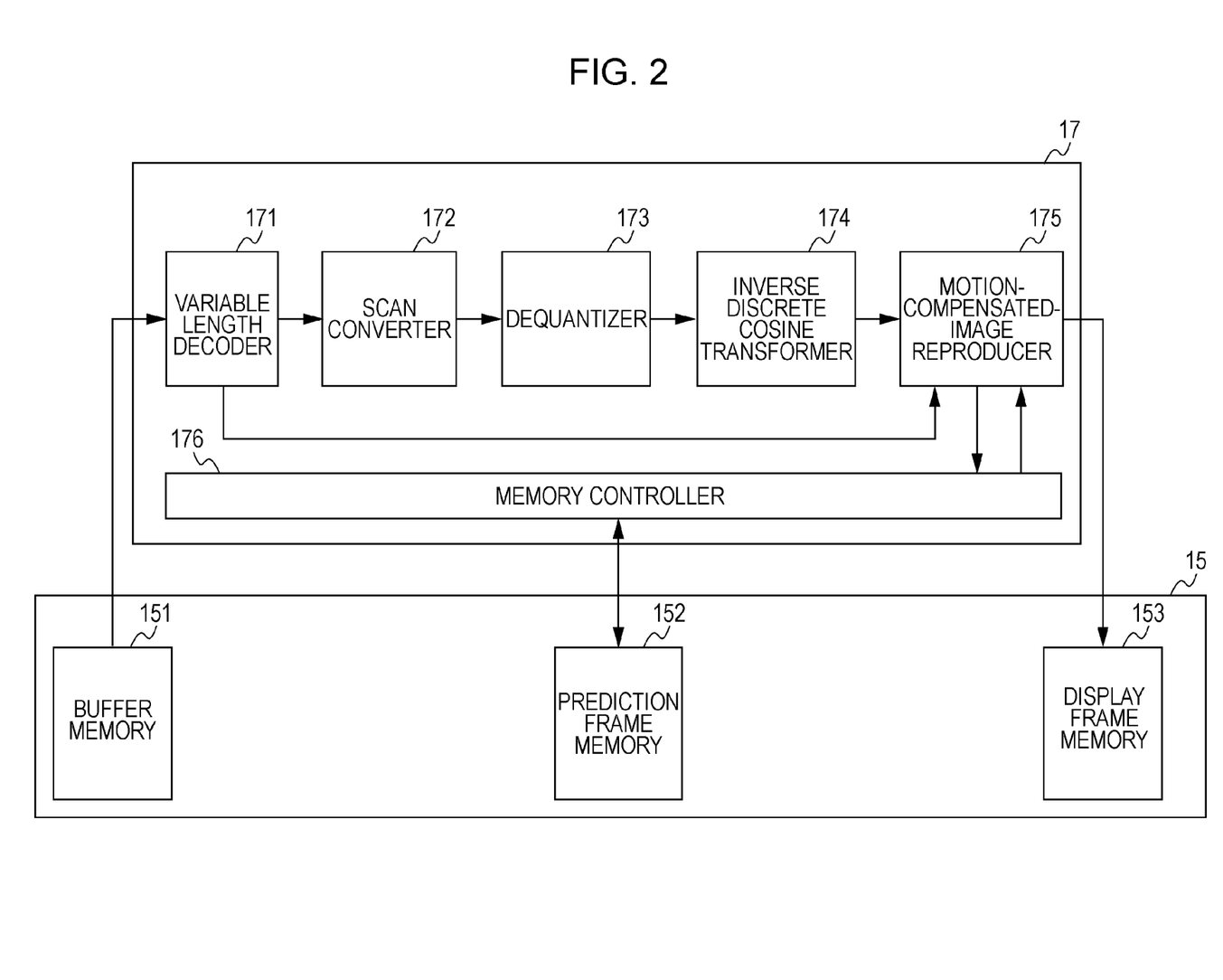
FIG. 2 is a block diagram showing an example of the configuration of an image decompressing circuit and a DRAM, which are connected to each other via an internal bus, according to an exemplary embodiment of the present invention.

FIG. 2 is a block diagram showing an example of the configuration of the image decompressing circuit 17 and the DRAM 15, which are connected to each other via the internal bus 19. The configuration includes the image decompressing circuit 17 that decompresses and decodes an input bit stream to output image data and the DRAM 15 that stores the decompressed image data as predicted data. The image decompressing circuit 17 includes a variable length decoder 171, a scan converter 172, a dequantizer 173, an inverse discrete cosine transformer 174, a motion-compensated-image reproducer 175, and a memory controller 176. The DRAM 15 includes a buffer memory 151 in which input bit streams are stored, a prediction frame memory 152, and a display frame memory 153.

The prediction frame memory 152 and the display frame memory 153 each have a capacity for storing decompressed images and display data, respectively, corresponding to multiple frames. The prediction frame memory 152 and the display frame memory 153 are controlled so that the prediction frame memory that is being used in the decompression and the display frame memory whose data is being displayed are not overwritten.

The variable length decoder 171 performs variable length decoding on a bit stream corresponding to one frame, which is read out from the input bit streams stored in the buffer memory 151 and is input into the image decompressing circuit 17. In addition, the variable length decoder 171 supplies information indicating, for example, a motion vector and a transformation coefficient resulting from the variable length decoding to the scan converter 172 and the motion-compensated-image reproducer 175. In the transformation coefficient output from the variable length decoder 171, a direct current (DC) component, lower-frequency components, and higher-frequency components are arranged in the described order. Since all the bit streams are not subjected to variable length coding, the variable length decoder 171 also performs the decoding for fixed length codes.

The scan converter 172 converts the order in the transformation coefficient supplied from the variable length decoder 171 into a raster scan order and supplies the transformation coefficient resulting from the scan conversion to the dequantizer 173.

The dequantizer 173 dequantizes the transformation coefficient that is supplied from the scan converter 172 and that is subjected to the scan conversion and supplies the dequantized transformation coefficient to the inverse discrete cosine transformer 174.

The inverse discrete cosine transformer 174 performs inverse discrete cosine transform on the transformation coefficient that is supplied from the dequantizer 173 and that is subjected to the dequatization and supplies the transformation coefficient resulting from the inverse discrete cosine transform to the motion-compensated-image reproducer 175.

The motion-compensated-image reproducer 175 reads out a decompressed image (predicted data) stored in the prediction frame memory 152 via the memory controller 176 on the basis of the information (encoding information) indicating a motion vector etc. supplied from the variable length decoder 171. The motion-compensated-image reproducer 175 adds the predicted data to the transformation coefficient that is supplied from the inverse discrete cosine transformer 174 and that is subjected to the inverse discrete cosine transform to generate decompressed data. The generated decompressed data is written in an appropriate address in the prediction frame memory 152 through the memory controller 176 so that the readout predicted data is not overwritten with the decompressed data and is externally output. The decompressed image data that is externally output is processed into a display size and format and the processed data is written in the display frame memory 153.

Figure 3:
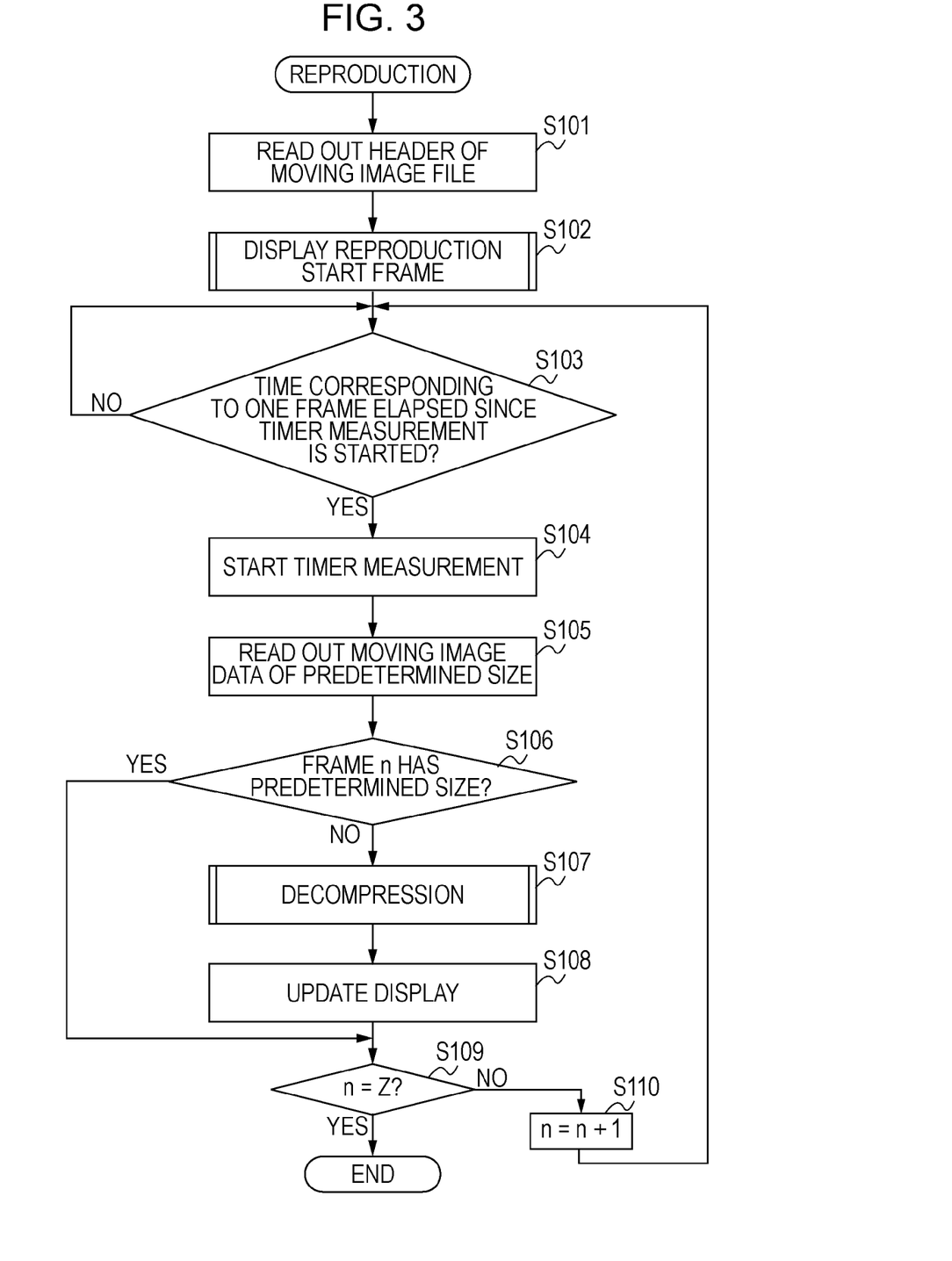
FIG. 3 is a flowchart showing an example of a reproduction process according to an exemplary embodiment of the present invention.

FIG. 3 is a flowchart showing an example of a reproduction process in the moving-image reproducing apparatus 10 according to an exemplary embodiment of the present invention. Each step in the reproduction process is realized by the CPU 11 that extracts the programs stored in, for example, the ROM 12 in the DRAM 15 and executes the extracted programs.

When start of reproduction of a moving image is instructed by the operation unit 14, in Step S101, the CPU 11 reads out the header of a moving image file recorded in the recording medium 20 and writes the readout header of the moving image file in the DRAM 15. The header of the moving image file has attribute information, such as the recording time, the file size, the frame rate, and the data size of each frame, recorded thereon. The attribute information in the moving image file may be recorded in a thumbnail file or another file, instead of in the header of the moving image file. In such a case, the CPU 11 reads out a part including the attribute information from the file in which the attribute information about the moving image file is recorded, instead of from the header of the moving image file, and writes the readout part in the DRAM 15.

In Step S102, the CPU 11 causes the image decompressing circuit 17 to decompress a frame where the reproduction is started (hereinafter referred to as a reproduction start frame) and causes the image processing circuit 18 to resize the reproduction start frame into a display size to write the reproduction start frame in the display frame memory 153 in the DRAM 15. The reproduction start frame is displayed in the display unit 13. A process of displaying the reproduction start frame will be described below with reference to FIG. 4.

After the reproduction start frame is displayed in Step S102, then in Step S103, the CPU 11 determines whether the time corresponding to the elapse of one frame since the previous measurement by a timer is started. If the CPU 11 determines that the time corresponding to one frame did not elapse since the previous timer measurement is started (NO in Step S103), the process repeats Step S103 to enter a waiting state until the time corresponding to one frame elapses. If the CPU 11 determines that the time corresponding to the elapse of one frame since the previous timer measurement is started (YES in Step S103), the process goes to Step S104. The time corresponding to one frame is about 33 ms if the frame rate is 30 frames per second (fps).

In Step S104, the CPU 11 causes the timer to start the measurement. If the measurement by the timer has been started before Step S104, the CPU 11 clears the measurement and starts the measurement by the timer again.

In Step S105, the CPU 11 reads out moving image data of a predetermined size from the last position written in the DRAM 15 from the moving image file recorded in the recording medium 20 and writes the readout moving image data in the buffer memory 151 in the DRAM 15.

In Step S106, the CPU 11 determines whether a frame n to be decompressed has a predetermined data size. Whether all the MBs in the frame n, which is one frame of a movie, are SMBs is determined in Step S106. Since the MB that is an SMB has a specific data size, the SMB image in which all the MBs are SMBs has a fixed data size that is uniquely defined in accordance with the number of recorded pixels. Accordingly, if the frame n has the fixed data size (predetermined data size), the frame n is determined to be an SMB image. The data size of the frame n is acquired by analyzing the attribute information in the moving image file read out in Step S101 (attribute analysis).

If the CPU 11 determines that the frame n does not have the predetermined data size, that is, that all the MBs in the frame n are not SMBs (NO in Step S106), the process goes to Step S107. In Step S107, the CPU 11 inputs compressed frame data about the frame n into the image decompressing circuit 17 where the compressed frame data is decompressed and the CPU 11 causes the image processing circuit 18 to resize the frame data into a display size. The CPU 11 performs a decompression process for writing the frame data in the display frame memory 153 in the DRAM 15. The decompression process in Step S107 will be described below with reference to FIG. 5.

In Step S108, the CPU 11 updates the display so as to display the frame n decompressed in Step S107 in the display unit 13 (display control) and the process goes to Step S109.

If the CPU 11 determines that the frame n has the predetermined data size, that is, that all the MBs in the frame n are SMBs (YES in Step S106), the process skips the decompression in Step S107 and the update of the display in Step S108 and goes to Step S109. Specifically, none of the variable length decoding, the scan conversion, the dequantization, the inverse discrete cosine transform, and the motion-compensated-image reproduction by the image decompressing circuit 17 is performed on the SMB image and the display of the image that has been displayed in the previous frame is continued.

In Step S109, the CPU 11 determines whether the frame n is a final frame Z of the moving image file that is being reproduced. If n=Z, the reproduction process is terminated because the reproduction is completed up to the final frame. If n≠Z, the process goes to Step S110 because the reproduction is not completed up to the final frame. In Step S110, the CPU 11 sets n=n+1. Then, the process goes back to Step S103 to process the next frame.

As described above, in the reproduction process of a moving image in the present embodiment, it is determined whether a frame to be reproduced is an SMB image on the basis of the attribute information without decompressing the compressed frame data about the frame. If the frame to be reproduced is an SMB image, the compressed frame data about the frame is not supplied to the image decompressing circuit 17 and the decompression and the update of the display are not performed. Since the SMB image is completely the same as that displayed in the previous frame, the display of the previous frame is continued in a state in which the compressed frame data, which is an SMB image, is not processed or is hardly processed to present the image of the previous frame as the image of the current frame. Accordingly, it is possible to greatly reduce the amount of memory transfer and the power consumption.

Although the data size of a frame to be reproduced is used in the determination of whether the frame is an SMB image, the determination method is not restricted to the use of the data size as long as whether a frame to be reproduced is an SMB image can be determined by analyzing the attribute information without decompressing the compressed frame data about the frame. For example, different frames, which are SMB images, have the same checksum or hash value if they have the same number of recorded pixels. Accordingly, the checksum or hash value of a frame to be reproduced may be acquired by analyzing the attribute information without decompressing the compressed frame data about the frame and it may be determined that the frame is an SMB image if the checksum or hash value is equal to a predetermined value. Alternatively, the frame number of a frame, which is an SMB image, may be recorded as the attribute information, for example, in the recording of the moving image and it may be determined that the frame is an SMB image by referring to the frame number.

In special reproduction (not normal reproduction), such as fast forward or fast reverse reproduction, the image that has been displayed in the previous frame is not necessarily used even if a frame to be reproduced is an SMB image. Accordingly, the compressed frame data may be supplied to the image decompressing circuit 17 to perform the decompression and the update of the display.

Figure 4:
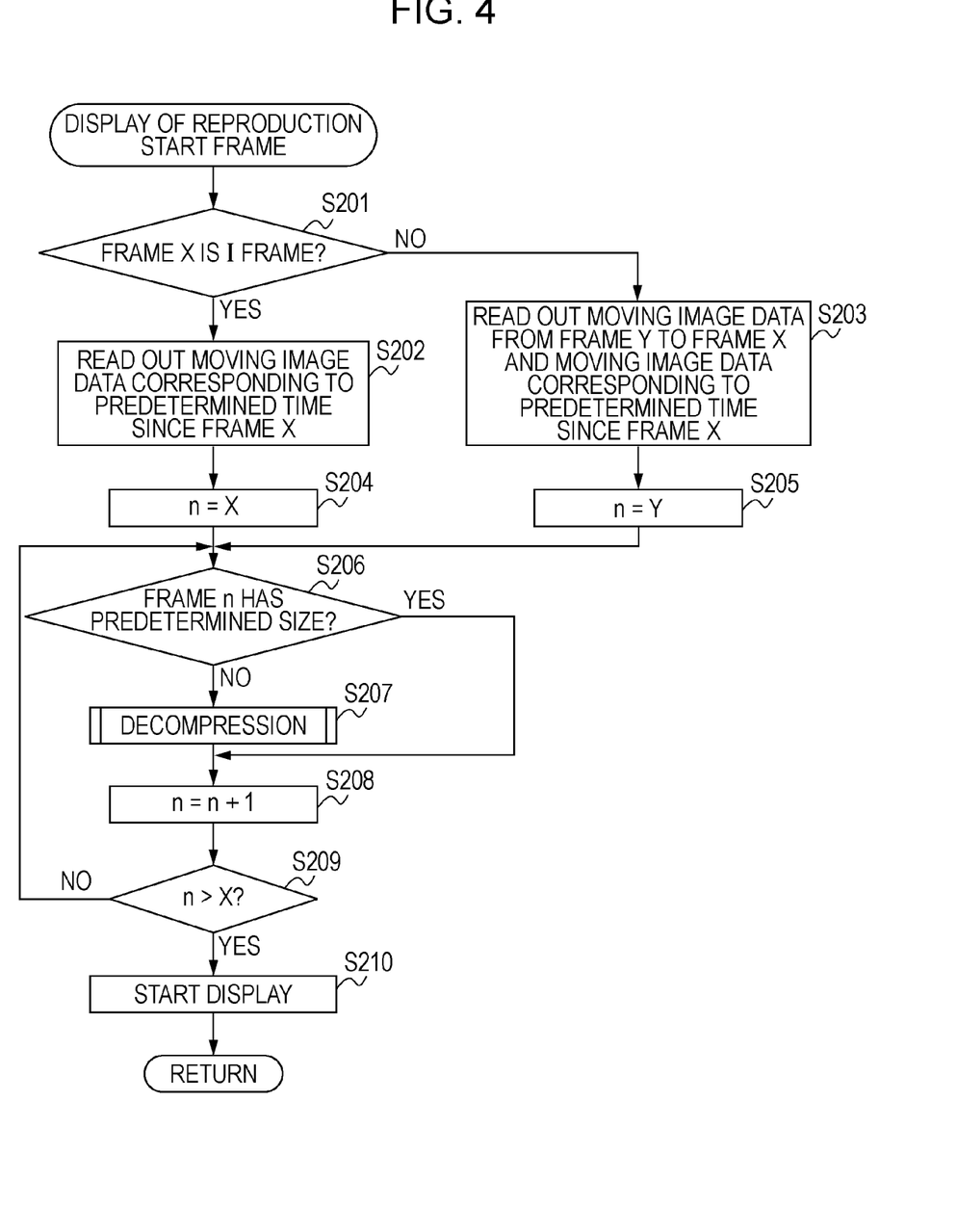
FIG. 4 is a flowchart showing an example of a process of displaying a reproduction start frame according to an exemplary embodiment of the present invention.

FIG. 4 is a flowchart showing an example of the process of displaying the reproduction start frame in Step S102 in FIG. 3. Each step in the process of displaying the reproduction start frame is realized by the CPU 11 that extracts the programs stored in, for example, the ROM 12 in the DRAM 15 and executes the extracted programs.

Referring to FIG. 4, in Step S201, the CPU 11 determines whether a reproduction start frame X is an I frame. The reproduction start frame X may be a frame next to the frame that has been finally displayed in the previous reproduction or may be the first frame of the moving image file. The I frame means an intraframe, which is encoded without using intraframe prediction. If the CPU 11 determines that the reproduction start frame X is an I frame (YES in Step S201), the process goes to Step S202. If the CPU 11 determines that the reproduction start frame X is not an I frame (NO in Step S201), the process goes to Step S203.

In Step S202, the CPU 11 reads out the moving image data corresponding to a predetermined time since the reproduction start frame X from the moving image file recorded on the recording medium 20 and writes the readout moving image data in the buffer memory 151 in the DRAM 15. In Step S204, the CPU 11 sets a frame n to be decompressed as the reproduction start frame X and the process goes to Step S206.

In Step S203, the CPU 11 reads out the moving image data from an I frame Y immediately before the reproduction start frame X to the reproduction start frame X and the moving image data corresponding to a predetermined time since the reproduction start frame X from the moving image file recorded on the recording medium 20 and writes the readout moving image data in the buffer memory 151 in the DRAM 15. This is because the reproduction start frame X can be decompressed only when the decompression is sequentially performed from the previous I frame Y if the reproduction start frame X is not an I frame. In Step S205, the CPU 11 sets the frame n to be decompressed as the I frame Y immediately before the reproduction start frame X and the process goes to Step S206.

In Step S206, the CPU 11 determines whether the frame n to be decompressed has a predetermined data size. Whether all the MBs in the frame n are SMBs is determined in Step S206, as in Step S106 in FIG. 3.

If the CPU 11 determines that the frame n does not have the predetermined data size, that is, that all the MBs in the frame n are not SMBs (NO in Step S206), the process goes to Step S207. In Step S207, the CPU 11 inputs the compressed frame data about the frame n into the image decompressing circuit 17 where the compressed frame data is decompressed and the process goes to Step S208. The decompression process in Step S207 is similar to Step S107 in FIG. 3 and will be described below with reference to FIG. 5.

If the CPU 11 determines that the frame n has the predetermined data size, that is, that all the MBs in the frame n are SMBs (YES in Step S206), the process skips the decompression in Step S207 and goes to Step S208.

In Step S208, the CPU 11 sets n=n+1. In Step S209, the CPU 11 determines whether n>X, that is, whether the decompression is completed up to the reproduction start frame X.

If the CPU 11 determines that n≦X, that is, that the decompression is not completed up to the reproduction start frame X (NO in Step S209), the process goes back to Step S206 to process the next frame.

If the CPU 11 determines that n>X, that is, that the decompression is completed up to the reproduction start frame X (YES in Step S209), then in Step S210, the CPU 11 displays the frame n decompressed in Step S207 in the display unit 13 to start the display.

As described above, also when the decompression is performed up to the reproduction start frame X, a bit stream is not supplied to the image decompressing circuit 17 and the decompression is not performed if a frame to be decompressed is an SMB image, thus reducing the amount of memory transfer and the power consumption.

Figure 5:
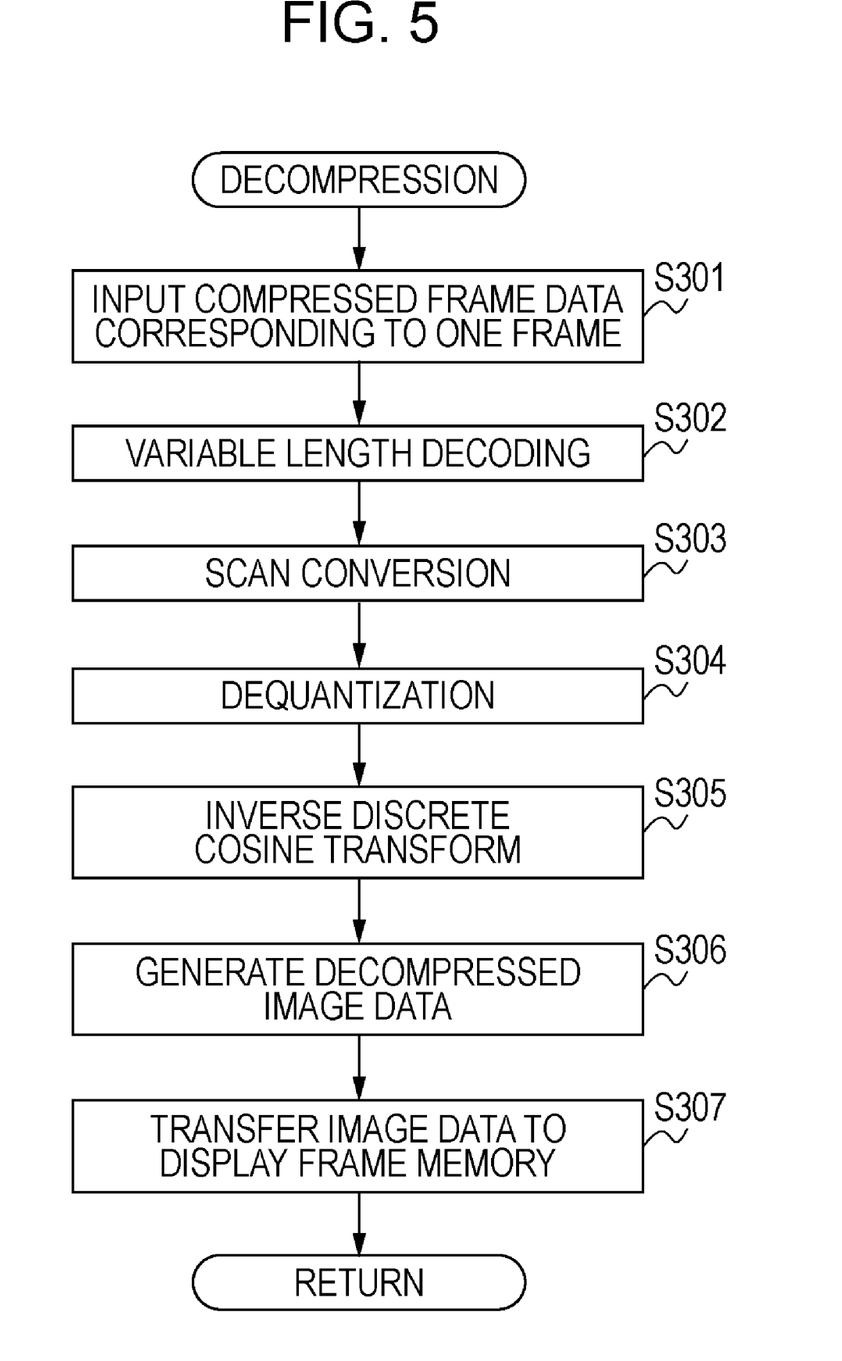
FIG. 5 is a flowchart showing an example of a decompression process according to an exemplary embodiment of the present invention.

FIG. 5 is a flowchart showing an example of the decompression process in Step S107 in FIG. 3 and in Step S207 in FIG. 4. Each step in the decompression process is realized by the CPU 11 that extracts the programs stored in, for example, the ROM 12 in the DRAM 15 and executes the extracted programs to control the image decompressing circuit 17 and the image processing circuit 18.

Referring to FIG. 5, in Step S301, the CPU 11 reads out the bit stream corresponding to one frame (the compressed frame data about the frame n) from the moving image data stored in the buffer memory 151 and inputs the readout bit stream in the image decompressing circuit 17.

In Step S302, the variable length decoder 171 performs the variable length decoding on the bit stream corresponding to one frame input in Step S301 and supplies information, such as the transformation coefficient, to the scan converter 172.

In Step S303, the scan converter 172 converts the transformation coefficient supplied from the variable length decoder 171 in Step S302 into a raster scan order and supplies the transformation coefficient to the dequantizer 173.

In Step S304, the dequantizer 173 dequantizes the transformation coefficient that is supplied from the scan converter 172 in Step S303 and that is subjected to the scan conversion and supplies the dequantized transformation coefficient to the inverse discrete cosine transformer 174.

In Step S305, the inverse discrete cosine transformer 174 performs the inverse discrete cosine transform on the transformation coefficient that is supplied from the dequantizer 173 in Step S304 and that is subjected to the dequatization and supplies the transformation coefficient resulting from the inverse discrete cosine transform to the motion-compensated-image reproducer 175.

In Step S306, the motion-compensated-image reproducer 175 adds the decompressed image (predicted data) to the transformation coefficient that is supplied from the inverse discrete cosine transformer 174 in Step S305 and that is subjected to the inverse discrete cosine transform to generate decompressed data. The decompressed data is written in the prediction frame memory 152 and is output from the image decompressing circuit 17. The processing in Step S306 is based on the information (encoded information), such as the motion vector, supplied from the variable length decoder 171. The decompressed image (predicted data) is read out from the prediction frame memory 152 via the memory controller 176.

In Step S307, the image processing circuit 18 processes the decompressed image data output from the image decompressing circuit 17 into a display size and format and the processed data is written in the display frame memory 153.

In the above description, if all the MBs in the frame n are SMBs (if the frame n is an SMB image), the display of the previous image is continued without decompression. However, the method of determining a frame in which the display of the previous image is continued without decompression is not restricted to the above one. The exemplary embodiments of the present invention are applicable to one frame of a movie, which can be determined to have the same image as that of the previous frame by analyzing the attribute information without decompressing the compressed frame data. Even if a frame to be reproduced is not an SMB image, a frame that is determined to have the same image as that of the previous frame is not decompressed and the display of the previous image is continued in the frame, thus reducing the amount of memory transfer and the power consumption.

The present invention can be embodied by supplying a storage medium that stores software program code realizing the functions according to the above embodiments to a system or an apparatus, the computer (or CPU or micro processing unit (MPU) in which system or apparatus reads out and executes the program code stored in the storage medium. In this case, the program code itself read out from the storage medium realizes the functions according to the above embodiments and the present invention is applicable to the storage medium storing the program code. The storage medium supplying the program code may be, for example, a flexible disk, a hard disk, an optical disk, a magneto-optical disk (MO), a compact disc-read only memory (CD-ROM), a compact disc recordable (CD-R), a magnetic tape, a nonvolatile memory card, or a ROM.

The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in a function expansion board included in the computer or in a function expansion unit connected to the computer, the CPU or the like in the function expansion board or the function expansion unit may execute all or part of the actual processing based on instructions in the program code to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-236315 filed Sep. 16, 2008, which is hereby incorporated by reference herein in its entirety.

What is claimed is:

1. A moving-image reproducing apparatus comprising:
   an attribute analyzing unit configured to analyze an attribute of a movie;
   a determining unit configured to determine whether one frame of the movie has the same image as that of a previous frame on the basis of the analysis by the attribute analyzing unit;
   an input unit configured to input compressed frame data about a frame that is not determined to have the same image as that of the previous frame into a decompressing unit;
   a display controlling unit configured to cause the image in the frame data decompressed by the decompressing unit to be displayed as at least one frame; and
   a controlling unit configured to cause the compressed frame data about a frame that is determined to have the same image as that of the previous frame not to be input into the decompressing unit during normal reproduction.

2. A moving-image reproducing apparatus according to claim 1, wherein, in the case that a frame is determined to have the same image as that of the previous frame, the display controlling unit is configured to cause the image in the previous frame displayed by the display controlling unit to continue to be displayed as the image of the frame determined to have the same image as that of the previous frame.

3. A moving-image reproducing apparatus according to claim 1, wherein a frame comprises a plurality of macroblocks, and wherein the determining unit determines whether all the macroblocks in one frame of the movie are skipped macroblocks on the basis of the analysis by the attribute analyzing unit.

4. A moving-image reproducing apparatus according to claim 3, wherein the attribute analyzing unit is configured to acquire a data size of one frame of the movie from the attribute, and wherein the determining unit configured to determine that all the macroblocks in the frame are skipped macroblocks if the data size of the frame is equal to a predetermined value.

5. A moving-image reproducing apparatus according to claim 3, wherein the attribute analyzing unit configured to acquire a checksum of one frame of the movie from the attribute, and wherein the determining unit configured to determine that all the macroblocks in the frame are skipped macroblocks if the checksum of the frame is equal to a predetermined value.

6. A moving-image reproducing apparatus according to claim 3, wherein the attribute analyzing unit configured to acquire a hash value of one frame of the movie from the attribute, and wherein the determining unit configured to determine that all the macroblocks in the frame are skipped macroblocks if the hash value of the frame is equal to a predetermined value.

7. A moving-image reproducing apparatus according to claim 1, wherein the controlling unit is configured to cause the compressed frame data about a frame that is determined to have the same image as that of the previous frame to be input into the decompressing unit when the movie is subjected to fast forward or fast reverse reproduction.

8. A moving-image reproducing method comprising:

analyzing an attribute of a movie;

determining whether one frame of the movie has the same image as that of a previous frame on the basis of the analysis in the attribute analyzing step;

inputting compressed frame data about a frame that is not determined to have the same image as that of the previous frame into a decompressing unit;

causing the image in the frame data decompressed by the decompressing unit to be displayed as at least one frame; and causing the compressed frame data about a frame that is determined to have the same image as that of the previous frame not to be input into the decompressing unit.

9. A computer-readable recording medium storing a program causing a computer to execute computer-executable instructions, the program comprising:

computer-executable instructions for analyzing an attribute of a movie;

computer-executable instructions for determining whether one frame of the movie has the same image as that of a previous frame on the basis of the analysis;

computer-executable instructions for inputting compressed frame data about a frame that is not determined to have the same image as that of the previous frame into a decompressing unit;

computer-executable instructions for causing the image in the frame data decompressed by the decompressing unit to be displayed as at least one frame; and computer-executable instructions for causing the compressed frame data about a frame that is determined to have the same image as that of the previous frame not to be input into the decompressing unit.

* * * * *